United States Patent [19]
Furukawa et al.

[11] Patent Number: 5,632,238
[45] Date of Patent: May 27, 1997

[54] CONTROL SYSTEM FOR AN INTERNAL COMBUSTION ENGINE WITH ASSOCIATED DECOMPRESSION DEVICE

[75] Inventors: Akiyoshi Furukawa; Takao Nishida; Atsushi Kamachi; Michio Suzuki; Kazushi Ogiyama; Yoshiharu Hagiwara; Kenji Fukuda, all of Saitama-ken, Japan

[73] Assignee: Honda Giken Kogyo Kabushiki Kaisha, Tokyo, Japan

[21] Appl. No.: 503,603

[22] Filed: Jul. 18, 1995

[30] Foreign Application Priority Data

Jul. 18, 1994 [JP] Japan ................................. 6-165224
Nov. 4, 1994 [JP] Japan ................................. 6-271512

[51] Int. Cl.[6] ........................ F02D 43/00; F02N 11/08
[52] U.S. Cl. ........................ 123/179.3; 123/179.4; 123/179.16; 123/179.18; 123/182.1; 290/34
[58] Field of Search .................... 123/179.3, 179.16, 123/179.17, 179.18, 179.28, 182.1, 179.4; 290/34

[56] References Cited

U.S. PATENT DOCUMENTS

| | | | |
|---|---|---|---|
| 4,200,079 | 4/1980 | Darlington | 123/179.16 |
| 4,543,927 | 10/1985 | Luhn et al. | 123/182.1 |
| 5,101,780 | 4/1992 | Jones | 123/182.1 |

FOREIGN PATENT DOCUMENTS

| | | | |
|---|---|---|---|
| 2-259232 | 10/1990 | Japan | 123/179.18 |
| 2-245409 | 10/1990 | Japan | 123/182.1 |
| 5-30582 | 2/1993 | Japan . | |
| 6-10107 | 3/1994 | Japan . | |

*Primary Examiner*—Andrew M. Dolinar
*Attorney, Agent, or Firm*—Weiner, Carrier & Burt, P.C.; Joseph P. Carrier; Irving M. Weiner

[57] ABSTRACT

The present invention as disclosed herein is directed to an engine with associated decompression device which is adapted to drive an onboard generator/electric motor. The present invention comprises an engine speed sensor means for detecting the speed of rotation of the engine, and a fuel injection control means for controlling the injection of a fuel in the engine. The decompression device is, for example, moved from an operative condition to an inoperative condition or vice versa in response to a sensed signal from the engine speed sensor means. The fuel injection control means is operable to initiate or stop the injection of the fuel in response to a sensed signal from the engine speed sensor means. The present invention provides an onboard electrical generating system which better controls vibration and exhaust emissions when the engine, particularly an onboard generator drive engine, is cranked and stopped.

21 Claims, 14 Drawing Sheets

Fig. 9
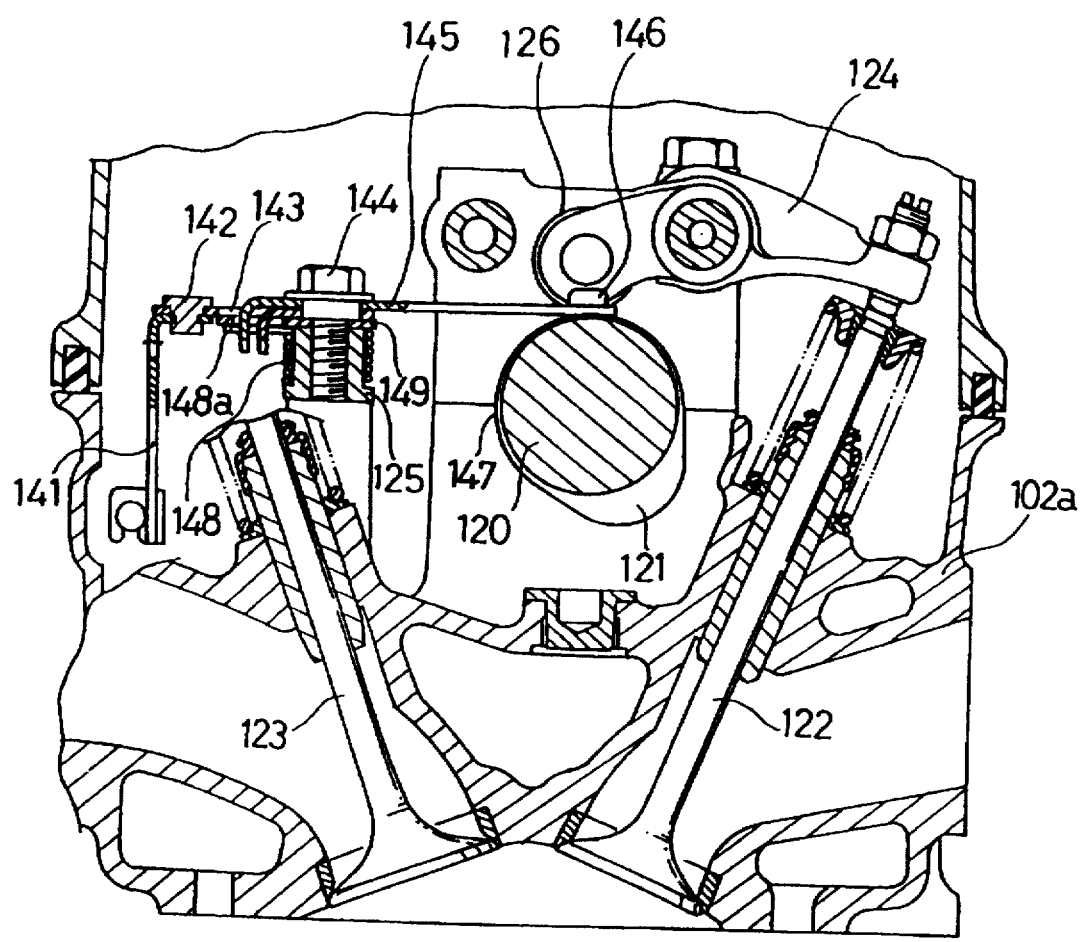
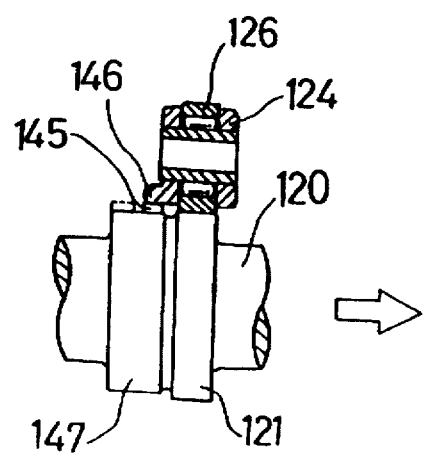
Fig. 10 (A)
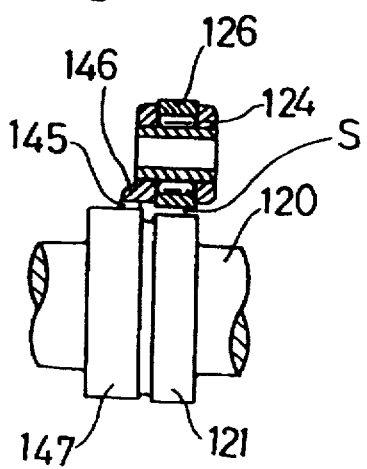
Fig. 10 (B)

CONTROL SYSTEM FOR AN INTERNAL COMBUSTION ENGINE WITH ASSOCIATED DECOMPRESSION DEVICE

BACKGROUND OF THE INVENTION

1. Field of the Invention

The present invention relates to a control system for an internal combustion engine with an associated decompression device designed to prevent or reduce vibration of the engine.

More particularly, the present invention relates to a control system for an internal combustion engine with an associated decompression device adapted to prevent or reduce vibration when the engine is cranked and stopped, the engine being mounted on an electric vehicle and operable to drive an onboard generator/electric motor.

2. Description of the Related Art

A conventional automatic decompression device for an internal combustion engine is disclosed in Japanese utility model publication No. 6-10107.

In this conventional art device, a camshaft has an axial bore to receive a slide pin. The slide pin has a tapered front end. As the engine starts, the slide pin is moved in one direction under the action of a spring. This causes the tapered front end of the slide pin to be forced into contact with the tapered hole of a decompression pin. Then, the decompression pin slightly projects from the surface of a cam to cause opening of intake and exhaust valves. This enables a reduction in the pressure within a combustion chamber.

As engine speed increases, a centrifugal weight enables the slide pin to be moved in the other direction against the action of the spring. The decompression pin is then withdrawn from the cam surface to move the intake and exhaust valves from their open condition to a closed condition.

Another decompression device is known from Japanese laid-open patent publication No. 5-305824.

In this known art device, an engine cylinder is provided with a decompression valve in addition to inlet and exhaust valves. No supply of fuel takes place when the decompression valve is open.

An electric vehicle is now in use and typically includes a battery. The battery is charged by an external source or by an onboard generator. However, the latter means or onboard generator suffers from the following problems.

The electric vehicle is typically less vibrated and noisy than a vehicle with a gasoline engine. However, when a generator is mounted on the electric vehicle, a generator drive engine is subject to vibration and resultant noise. This is particularly true when the engine is cranked and stopped, and presents a major problem. Vibration and noise when the engine is cranked and stopped deteriorate the comfort of persons in and around the electric vehicle.

The inventors have attempted to reduce vibration and noise when an engine is cranked and stopped, in the event that the engine is used in an electric vehicle to drive an onboard generator.

It is an object of the present invention to provide a control system for an internal combustion engine with an associated decompression device, the system being used in an electric vehicle with a generator/electric motor mounted thereon for better controlling vibration and exhaust emissions when the engine is cranked and stopped.

SUMMARY OF THE INVENTION

The present invention is directed to a control system for an engine with an associated decompression device. The engine is mounted on an electric vehicle to drive an onboard generator/electric motor. The electric vehicle is less vibrated and makes less noise than a vehicle with an gasoline engine. However, the electric vehicle is subject to vibration and noise when a generator is mounted to charge a battery and is driven by the engine. This is particularly true when the generator drive engine is cranked and stopped.

According to a first concept of the present invention, an engine is an onboard generator drive engine associated with a decompression device and an onboard generator/electric motor. An onboard electrical generating system with such engine comprises an engine speed sensor means for detecting the speed of rotation of the onboard generator drive engine, and a fuel injection control means for controlling the injection of a fuel in the onboard generator drive engine. The decompression device is operable in accordance with the speed of rotation of the engine or in response to the sensed engine speed. The fuel injection control means is operable to initiate or stop the injection of the fuel in response to a sensed signal from the engine speed sensor means.

A crank command signal sensor means is provided to detect whether a crank command signal is sent to the onboard generator/electric motor. The crank command signal sensor means develops a sensed signal to thereby drive the onboard generator/electric motor as an electric motor and operate the engine. The decompression device is moved from its operative condition to its inoperative condition when the speed of rotation of the engine is below a decompression inoperative speed.

The system also comprises a stop sensor means for detecting whether the decompression device is stopped, and a cranking speed sensor means for detecting cranking speed of the engine. The engine is operable to initiate the injection of the fuel in response to a sensed signal from the stop sensor means and a sensed signal from the cranking speed sensor means.

The onboard generator/electric motor is provided with a stop command signal sensor means for detecting a stop command signal. The stop command signal sensor means develops a sensed signal to thereby stop the injection of the fuel in the engine and thereafter, to stop the electric motor. The decompression device is moved from its inoperative condition to its operative condition when the speed of rotation of the engine is below a decompression operative speed.

The speed of rotation of the engine when the decompression device is operated and stopped is less than the speed of rotation when the engine is operable to initiate and stop the injection of the fuel.

The speed of rotation of the engine when the decompression device is operated and stopped is greater than the speed of rotation when the engine is subject to resonance.

As the crank command signal sensor means detects a crank command signal, the decompression device in its operative condition reduces engine torque. In this state, the onboard generator/electric motor acts as a electric motor to increase the speed of rotation of the engine. When the engine speed exceeds a decompression inoperative speed, the decompression device is moved from its operative condition to its inoperative condition. As the engine speed further increases, the stop sensor means detects the inoperative condition of the decompression device. When the cranking speed sensor means detects that the engine speed reaches a cranking speed, the fuel injection control means is operable to initiate the injection of the fuel and start the engine. As the engine starts, the electric motor then acts as a generator to supply electric power to the vehicle drive electric motor or to charge the battery.

Thereafter, the stop command signal sensor means detects a stop signal indicative of the stoppage of the vehicle or a stop command signal indicating that the battery is recharged to a predetermined charge level. As this occurs, the fuel injection control means is operable to stop the injection of the fuel. The engine is also thereby stopped. Thereafter, the electric motor no longer acts as a generator. When the speed of rotation of the engine is below a decompression operative speed, or when the engine speed sensor means detects that the engine speed is below a decompression operative speed, the decompression device is automatically moved from its inoperative condition to its operative condition and is ready for the next cranking operation.

The decompression device is in its operative condition to reduce engine torque when the engine is initially operated. Thus, the engine is less vibrated during a cranking operation. The fuel is injected while the decompression device is in its inoperative condition. This prevents escape of the fuel and better controls exhaust emissions. The decompression device is rendered operative when the engine speed is at a level at which the engine is subject to resonance. This brings about a reduction in vibration when the engine is cranked or stopped. Thus, it is possible to provide an engine driven generator for an electric vehicle which is less subject to vibration and noise.

According to a second concept of the present invention, there is provided a control means for an engine with an associated decompression device which comprises an intake airflow control valve control means for controlling an intake airflow control valve adapted to allow air to flow into the internal combustion engine, a fuel injection control means for controlling the injection of a fuel in the internal combustion engine, an engine speed sensor means for detecting the speed of rotation of the internal combustion engine, a decompression means for reducing pressure within a cylinder of the internal combustion engine, and a starter means for initiating rotation of the internal combustion engine. The control system also includes a crank signal sensor means for detecting a crank signal to the internal combustion engine. The intake airflow control valve is moved to its open condition as the crank signal is developed. Also, the starter means is operable to initiate rotation of the internal combustion engine. The decompression means is rendered inoperative in response to a predetermined cranking speed. When engine speed exceeds the cranking speed, the fuel injection control means is operable to initiate the injection of the fuel. Preferably, the cranking speed is greater than a speed at which the internal combustion engine is subject to resonance. The internal combustion engine is adapted for use in an onboard generator drive engine. The decompression means comprises a first actuator element, a second actuator element, and a resilient element disposed between the first and second actuator elements. The internal combustion engine includes a plurality of cylinders. One of the first actuator elements is provided for each cylinder. The resilient element between the first and second actuator elements is constructed to follow vacuum action of each cylinder. The decompression means further includes an element for limiting movement of the first and second actuators.

When the crank signal sensor means detects the presence of a crank signal, the intake airflow control valve control means is operable to move the intake airflow control valve to its open condition and drive the internal combustion engine so as to reduce load under vacuum during the intake stroke. Then, the decompression means is moved from its operative condition to its inoperative condition when the engine speed exceeds a predetermined level at which the internal combustion engine is subject to resonance. When the engine speed exceeds a cranking speed, the fuel injection control means is operable to initiate the injection of the fuel.

The decompression means is rendered operative when the first actuator element is rotated in a predetermined direction to cause the second actuator element to move within a range limited by the limiting element and enter between a rocker arm and a camshaft. The decompression means is rendered inoperative when these elements are operated in a reverse fashion.

BRIEF DESCRIPTION OF THE SEVERAL VIEWS OF THE DRAWINGS

FIG. 9 is a vertical sectional view, in side elevation, of the decompression device with engine intake and exhaust valves;

FIGS. 10(A) and 10(B) illustrate operation of the decompression device;

DETAILED DESCRIPTION

Preferred embodiments of the present invention will now be described in detail with reference to the accompanying drawings.

FIGS. 1 to 6 show a first concept of the present invention.

The present invention is applied to an internal combustion engine for use in an electrical generating system mounted on a vehicle.

Figure 1:
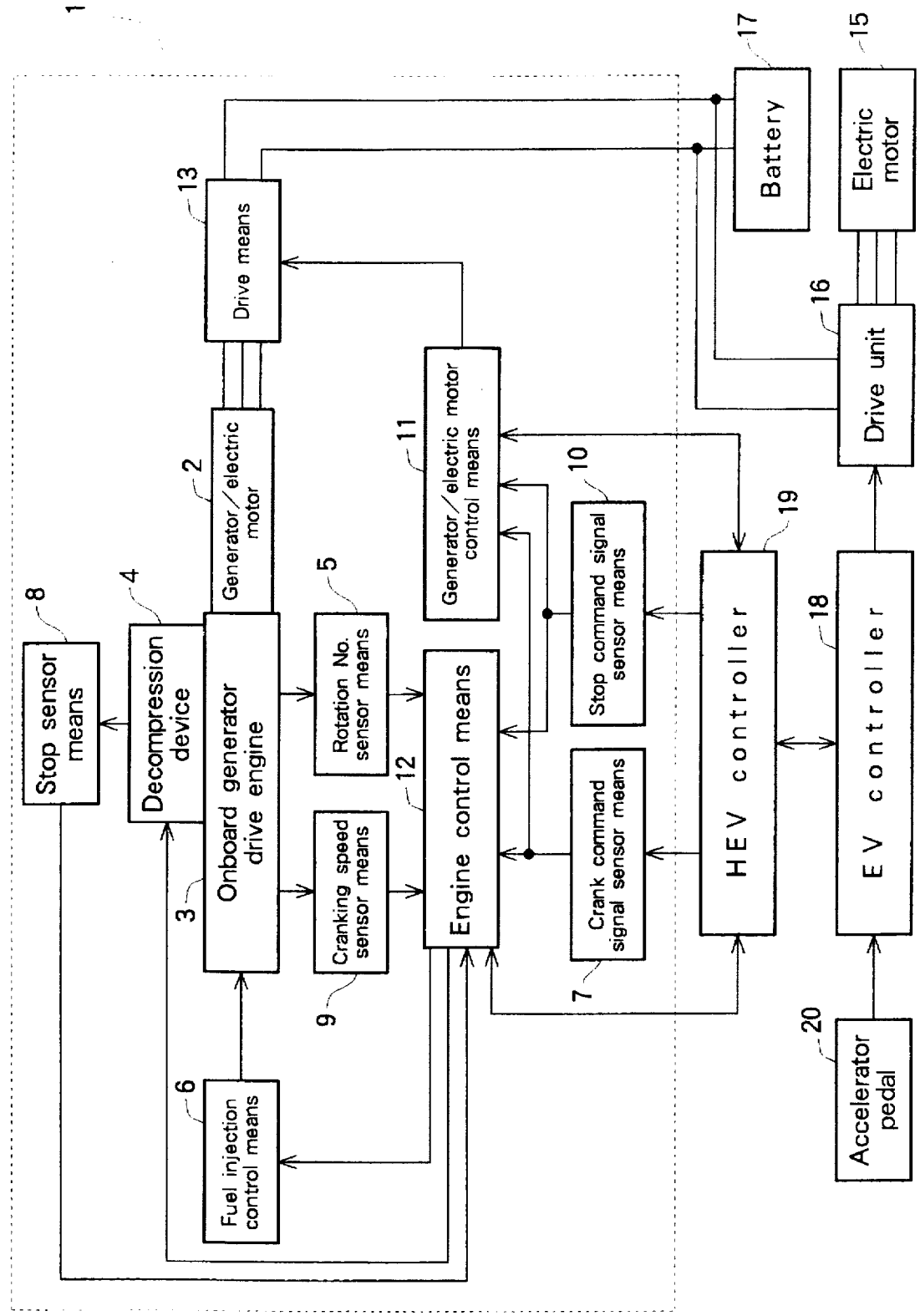
FIG. 1 shows a first concept of the present invention and is a block diagram of a control system for an onboard generator drive engine.
Figure 6:
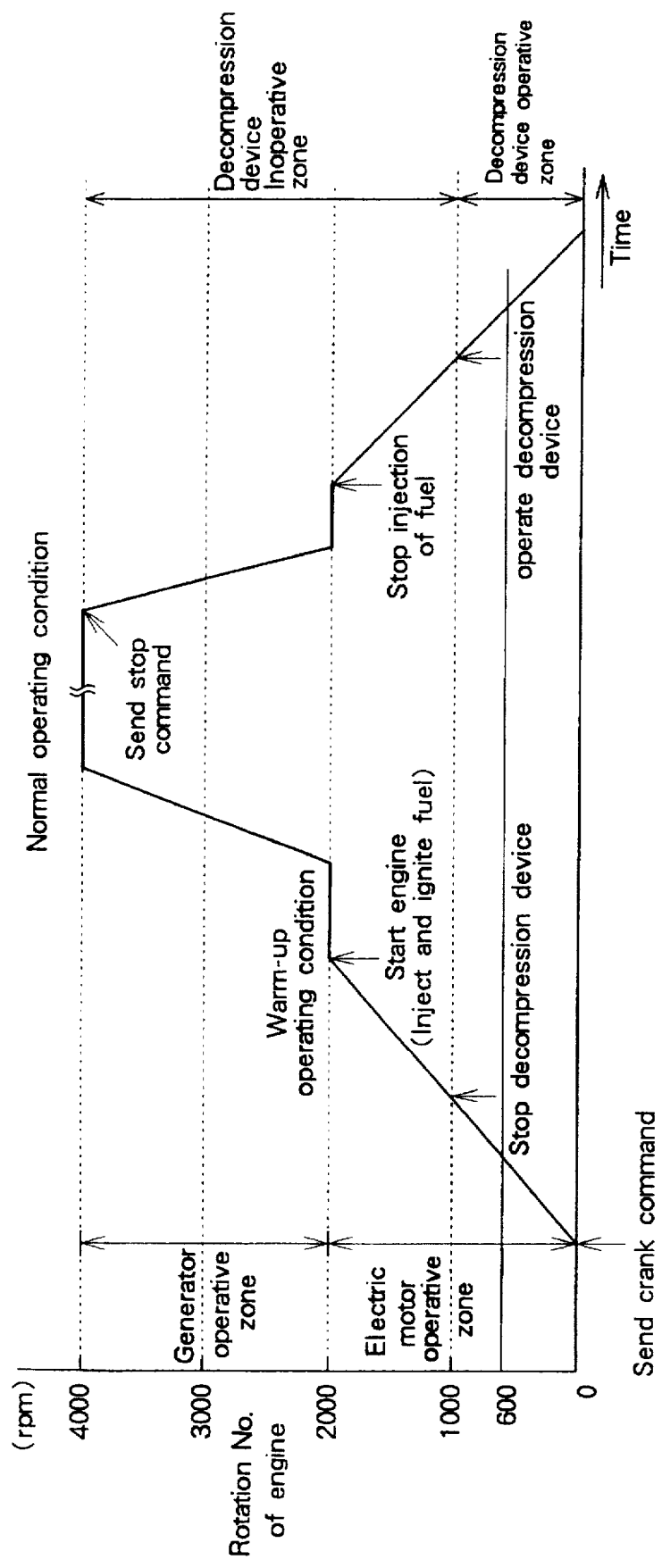
FIG. 6 is a timing chart showing engine speed in one of the vertical axes, decompression operative and inoperative zones in the other vertical axis, and time in the horizontal axis.

FIG. 1 is a block diagram of a control system for controlling an engine in an onboard electrical generating system. FIG. 6 is a timing chart showing engine speed in one of the vertical axes, decompression device operative and inoperative zones in the other vertical axis, and time in the horizontal axis.

As shown in FIG. 1, an onboard electrical generating system 1 comprises an onboard generator/electric motor 2 which acts as an electric motor or a combined generator and electric motor, a generator drive engine 3 for driving the generator/electric motor 2 as a generator, and a decompression device 4 adapted to reduce engine torque. One form of the decompression device will be described with reference to FIGS. 2 to 5.

Figure 2:
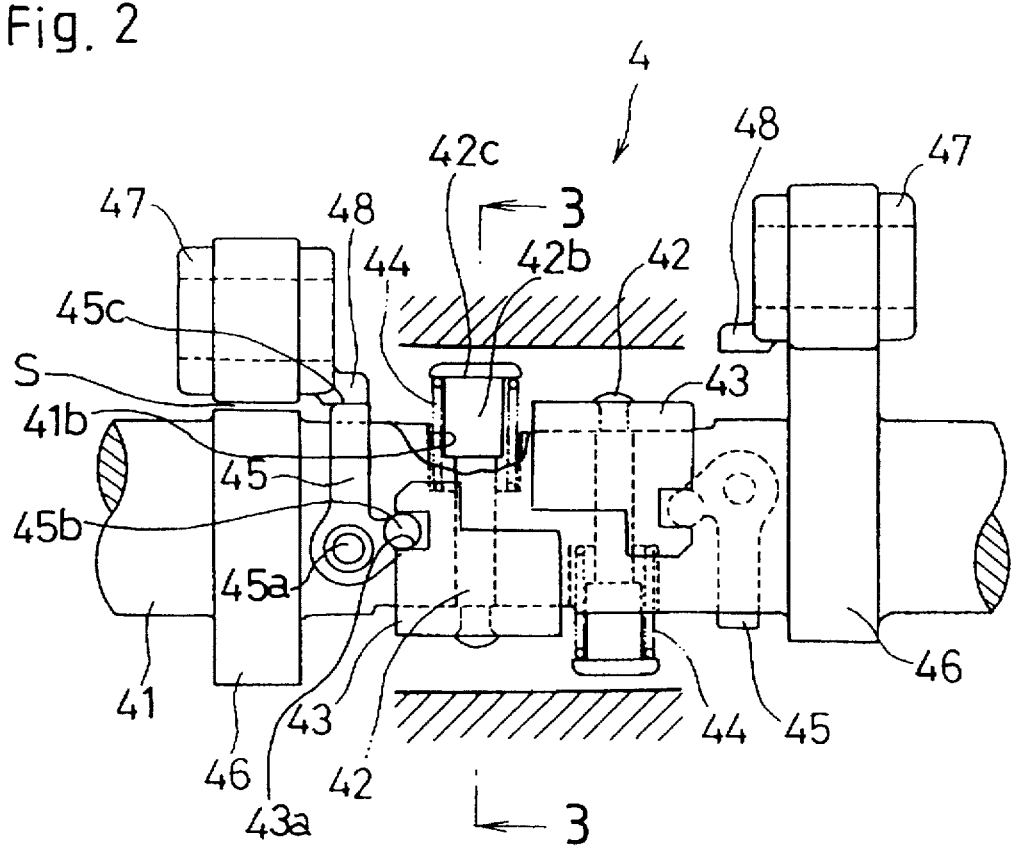
FIG. 2 is a schematic view of one form of a decompression device in an operative condition.
Figure 3:
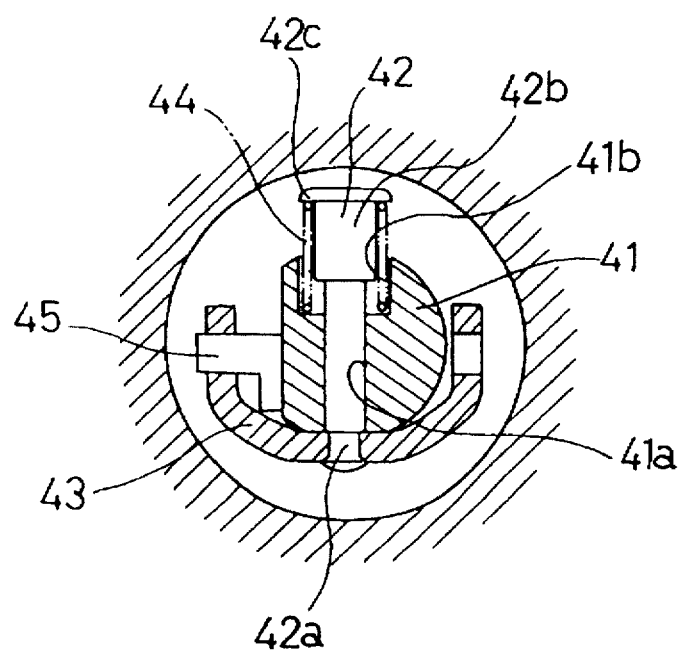
FIG. 3 is a sectional view taken along the line 3—3 of FIG. 2.
Figure 4:
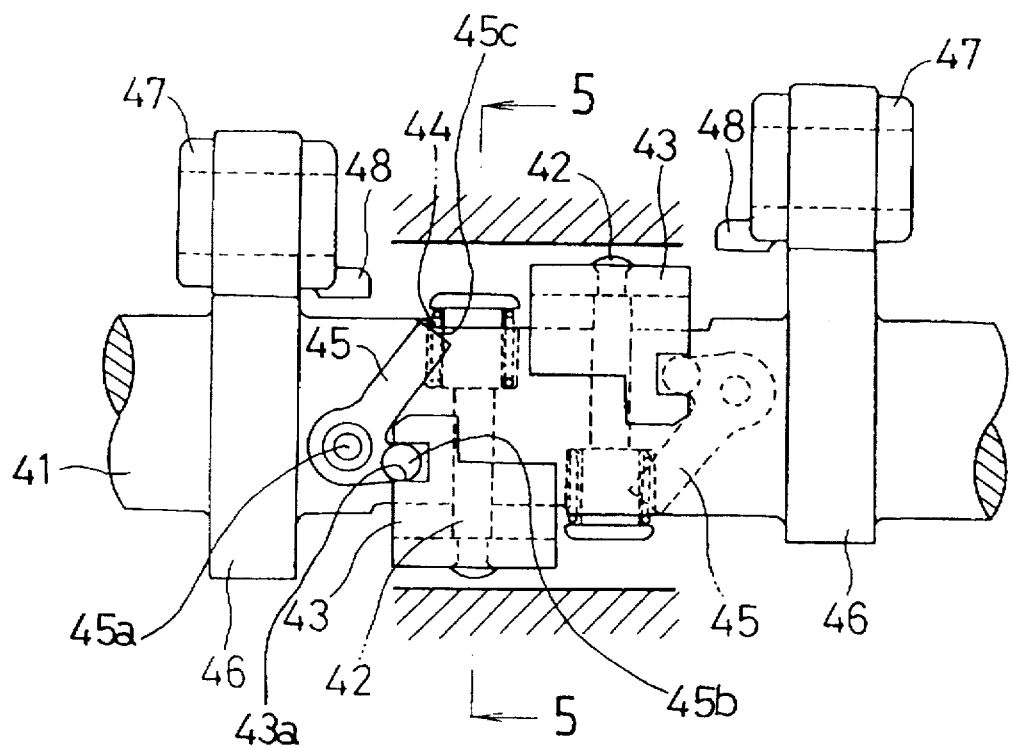
FIG. 4 is a schematic view of the decompression device in an inoperative condition.
Figure 5:
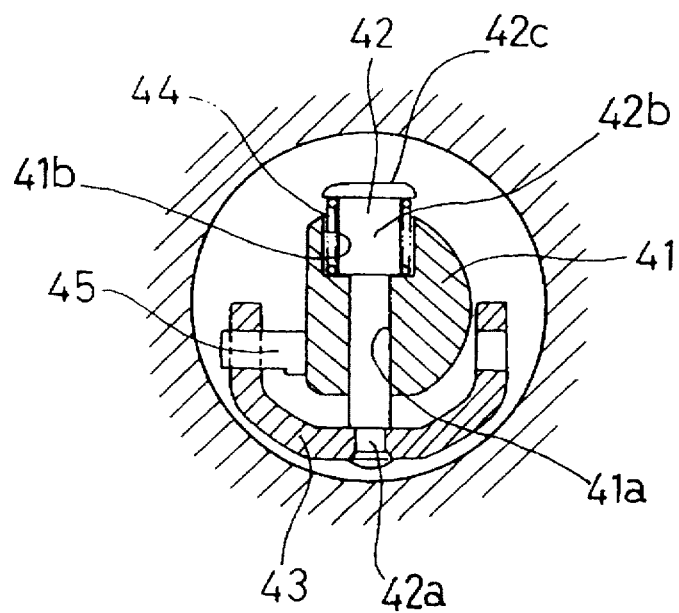
FIG. 5 is a sectional view taken along the line 5—5 of FIG. 4.

FIG. 2 schematically shows the decompression device in an operative condition. FIG. 3 is a sectional view taken along the line 3—3 of FIG. 2. FIG. 4 schematically shows the decompression device in an inoperative condition. FIG. 5 is a sectional view taken along the line 5—5 of FIG. 4.

The decompression device 4 includes a pin 42 extending through a bore 41a which in turn, extends radially through a camshaft 41. The pin 42 has one end 42a which projects from the outer periphery of the camshaft 41. A weight 43 is attached to the one end 42a of the pin 42. The pin 42 has an enlarged portion 42b and an end flange 42c. The camshaft 41 has a recess 41b at a location corresponding to the bore 41a. A spring 44 is disposed between the end flange 42c and the bottom of the recess 41b to urge the pin 42 so that the decompression device 4 is in its operative condition.

As shown in FIG. 2, a decompression cam 45 has a substantially L-shape as viewed in side elevation and is rotatably mounted at its middle to one side of the camshaft 41 by a pin 45a. The decompression cam 45 has an engagement portion 45b at its one end. The engagement portion 45b is engaged with a recess 43a which is formed in one axial end of the weight 43.

A valve rocker arm 47 is arranged in a face-to-face relation to a cam 46 of the camshaft 41 so as to open and close intake and exhaust valves. The rocker arm 47 has a decompression slipper 48.

The decompression cam 45 has an abutment surface 45c at its other end. As the engine starts, the abutment surface 45c is brought into abutment with the slipper 48 of the rocker arm 47 under the action of the spring 44 as shown in FIGS. 2 and 3. This abutment creates a space (s) between the lowest cam surface of the cam 46 and the rocker arm 47 and thus, hold the intake and exhaust valves in their open conditions. This results in a decrease in the pressure within an engine combustion chamber.

As engine speed increases, a centrifugal force causes the weight 43 to be radially outwardly moved against the action of the spring 44 as shown in FIGS. 4 and 5. As a result, the decompression cam 45 is rotated about the pin 45a in a clockwise direction (to the right) in FIG. 2 while the engagement portion 45b is in engagement with the recess 43a of the weight 43. The abutment surface 45c of the decompression cam 45 is then disengaged from the slipper 48 to allow the rocker arm 47 to contact the cam 46. Under the circumstances, the intake and exhaust valves of the engine can be moved by the rocker arm 47 to close intake and exhaust ports, as shown in FIGS. 4 and 5.

The decompression device is operated automatically with rotation of the camshaft as described earlier, but is not limited thereto. Alternatively, the decompression cam may be rotated in accordance with signals from an engine speed sensor means. Also, the decompression cam may be replaced by a decompression pin.

As shown in FIG. 1, the onboard electrical generating system 1 comprises an engine speed sensor means 5 for detecting the speed of rotation of the engine 3, a fuel injection control means 6 for controlling the injection of fuel in the engine 3, and a crank command signal sensor means 7 for detecting whether a crank command signal is sent to the onboard generator/electric motor 2. The system 1 also includes a stop sensor means 8 for detecting whether the decompression device 4 is stopped (or rendered inoperative), a cranking speed sensor means 9 for detecting cranking speed of the engine 3, and a stop command signal sensor means 10 for detecting whether a stop command signal is sent to the onboard generator/electric motor 2.

The onboard electrical generating system 1 further includes a generator/electric motor control means 11 for controlling the generator/electric motor 2, an engine control means 12 for controlling the engine 3, and a generator/electric motor drive means 13 for driving the generator/electric motor 2.

Other main components in the electric vehicle include an electric motor 15 for driving the vehicle, an electric motor drive unit 16 for supplying a controlled amount of electric power to the electric motor 15, a battery 17 as a power source for supplying electric power to the electric motor 15 via the electric motor drive unit 16, and an electric vehicle (EV) controller 18 for controlling the electric motor drive unit 16 and other components.

Referring to FIG. 1, the reference numeral 19 designates a central or host electric vehicle (HEV) controller for generally controlling the EV controller 18, the generator/electric motor control means 11, and the engine control means 12. 20 designates an accelerator pedal for the electric vehicle.

Operation of the onboard electrical generating system 1 will now be described with reference to FIGS. 1 and 6.

In the electric vehicle provided with the electrical generating system 1, the EV controller 18 sends a drive command signal to the electric motor drive unit 16 when a driver operates the accelerator pedal 20. Then, electric power is supplied from the battery 17 through the electric motor drive unit 16 to the electric motor 15 so as to power the electric motor 15. This allows for running of the electric vehicle. The consumption of the battery 17 depends on the running condition of the electric vehicle. The battery power 17 is heavily consumed, particularly when the vehicle is started, is accelerated, and runs uphill.

During running of the electric vehicle (also, when the vehicle is stopped), the EV controller 18 is operable to determine the state-of-charge of the battery 17 by multiplying the values of an output current, an output voltage and other parameters. If it is less than a predetermined value, then the EV controller 18 instructs the crank command signal sensor means 7 through the HEV controller 19 to send a crank command signal to start the generator/electric motor 2.

The crank command signal sensor means 7 immediately sends the crank command signal to the generator/electric motor control means 11 and the engine control means 12. A driver may directly instruct the EV controller 18 to send a crank command signal.

The engine control means 12 then determines whether the decompression device is rendered operative to reduce engine torque. The generator/electric motor control means 11 instructs the generator/electric motor drive means 13 to use the generator/electric motor 2 as an electric motor.

The generator/electric motor 2 is driven upon receipt of power from the battery 17 and acts as an electric motor. Then, the speed of rotation of the engine 3 gradually increases as shown in FIG. 6. The decompression device 4 is moved from its operative condition to inoperative condition automatically when the engine speed exceeds, for example, 1,000 r.p.m. at which the decompression device is stopped, or when this state is detected.

When the stop sensor means 8 detects that the decompression device 4 is stopped, and the cranking speed sensor means 9 detects that cranking speed reaches, for example, 2,000 r.p.m., the engine control means 12 instructs the fuel injection control means 6 to initiate the injection of fuel. The engine 3 is warming up after it has been cranked. Thereafter, the engine 3 is operated at a normal speed, for example, at 2,000 to 4,000 r.p.m.

When the speed of the engine 3 reaches a normal level, the generator/electric motor control means 11 instructs the generator/electric motor drive means 13 to use the onboard generator/electric motor 2 as a generator. The onboard generator/electric motor 2 is then operated as a generator to feed electric power to the electric motor 15 through the generator/electric motor drive means 13, the battery 17 and the drive unit 16.

When the driver stops the electric vehicle, or when the battery 17 is recharged to a predetermined charge level, the EV controller 18 sends a stop command signal to the stop command signal sensor means 10 through the HEV controller 19.

The stop command signal is then sent from the stop command signal sensor means 10 to the generator/electric motor control means 11 and the engine control means 12.

The engine control means 12 instructs the fuel injection control means 6 to immediately stop the injection of fuel or gradually reduce the amount of fuel to be injected. When the rotational speed of the engine 3 is reduced to, for example, 2,000 r.p.m., instructions are given to stop the injection of fuel after the engine is operated at a speed of 2,000 r.p.m. for a predetermined period of time. Thereafter, operation of the generator/electric motor 2 as a generator is stopped.

The decompression device 4 is moved from its inoperative condition to operative condition automatically when the rotational speed of the engine 3 is reduced to, for example, below 1,000 r.p.m., or when the engine speed sensor means 5 detects that the engine speed is below a level at which the decompression device is to be operated. Thereafter, the engine 3 is stopped and prepared for the next cranking operation.

The rotational speed of the engine 3 is less when the decompression device 4 is moved from its operative condition to inoperative condition or vice versa than when the injection of fuel takes place or is stopped.

That is, no fuel is injected during operation of the decompression device 4 so as to better control exhaust emissions from the engine 3.

The rotational speed of the engine 3, when the decompression device 4 is moved from its operative condition to inoperative condition or vice versa, varies depending on the structure of engines or engine mounts. Also, the rotational speed of the engine 3 is greater when the engine is cranked or stopped than when the engine 3 is subject to resonance.

The engine 3 is subject to resonance at a speed, for example, 600 r.p.m., which is less than the rotational speed of the engine 3 when the decompression device 4 is operated, for example, at 1,000 r.p.m. as shown in FIG. 6. This results in a decrease in vibration of the engine 3 when it is cranked or stopped.

Again, the rotational speed of the engine 3 when it is subject to resonance is less than that of the engine 3 when the decompression device 4 is operated. In this way, the engine 3 is less vibrated when it is cranked or stopped while the decompression device 4 is in its operative condition. It is also possible to substantially reduce noise resulting from such vibration.

As thus far described, the decompression device is rendered operative when the onboard generator drive engine is cranked. This brings about a reduction in engine torque required to drive the onboard generator/electric motor as an electric motor. As such, the engine is less subject to vibration.

Fuel is injected after the decompression device is rendered inoperative at a desired engine speed. This prevents leakage of the fuel and better controls exhaust emissions when the engine is cranked.

The decompression device is again rendered operative at a desired engine speed after the injection is fuel is stopped. This also prevents leakage of the fuel and better controls exhaust emissions.

Moreover, when the decompression device is moved from its inoperative condition to operative condition or vice versa at a desired engine speed, the engine is subject to resonance while the decompression device is operated. The engine is less displaced or vibrated as it is cranked or stopped because the decompression device is in its operative condition during such times. It is thus possible to provide an engine, particularly for an onboard electrical generator/electric motor, which is less subject to noise.

A second concept of the present invention will now be described in detail.

Figure 7:
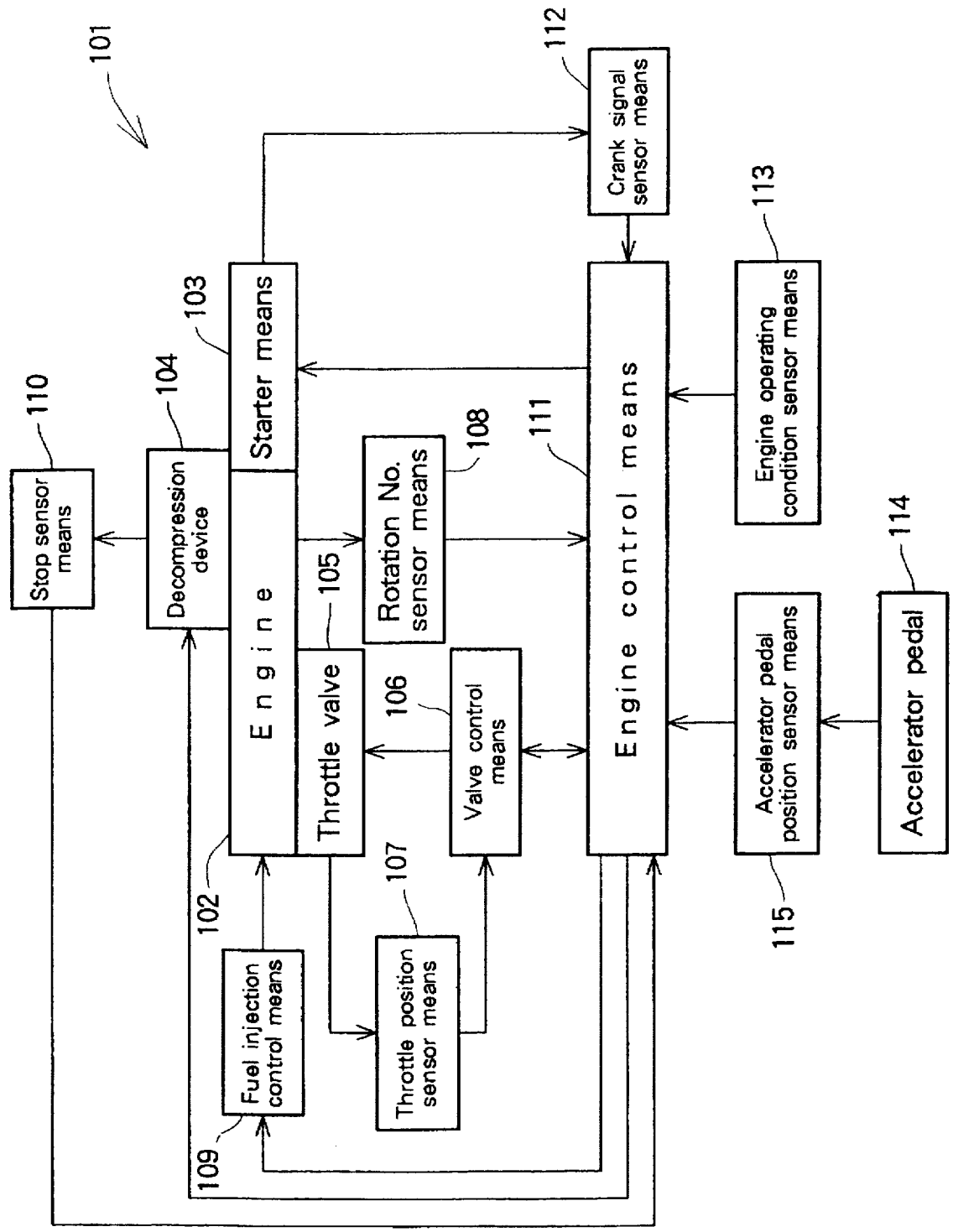
FIG. 7 shows a second concept of the present invention and is a block diagram of a control system for an engine with associated decompression device, according to a first embodiment of the present invention.

FIG. 7 is a block diagram of one example of a control system for use in an engine with associated decompression device according to a second concept of the present invention. A control system 101 is adapted to control the engine and prevent vibration.

The control system 101 comprises a starter means 103 for starting a vehicle engine 102, a decompression device 104 for reducing engine torque, a throttle valve 105 as an intake airflow control valve, and a valve control means 106 which includes a throttle position calculation means and a valve actuator means for actuating the throttle valve 105.

The engine control system 101 also comprises a throttle position sensor means 107 for detecting the position of the throttle valve 105, an engine speed sensor means 108 for detecting the speed of rotation of the engine 102, and a fuel injection control means 109 for controlling the injection of fuel in the engine 102. The system further includes a stop sensor means 110 for detecting whether the decompression device 104 is stopped or rendered inoperative, and an engine control means 111 for controlling the starter means 103, the decompression device 104, the valve actuator means 106, the fuel injection control means 109 and other means.

Also, there is provided a crank signal sensor means 112 for detecting whether a crank signal is sent from the starter means 103 to crank the engine 102. The crank signal may be an on-signal sent to an ignition switch. The reference numeral 113 designates an engine operating condition sensor means for detecting coolant temperature and other factors. Reference number 114 designates an accelerator pedal.

One form of the decompression device will now be described with reference to FIGS. 8 and 9.

Figure 8:
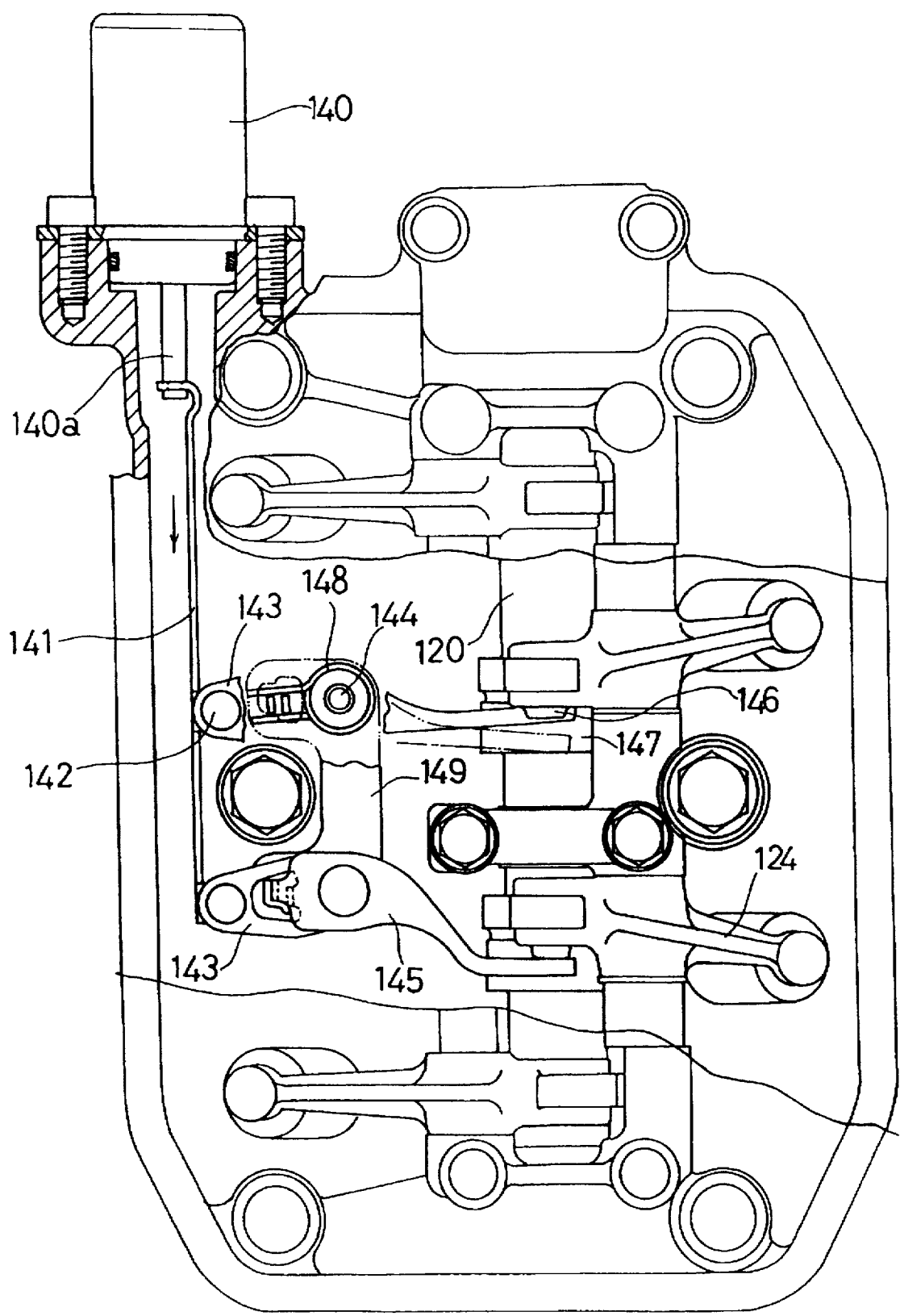
FIG. 8 is a plan view of one form of a decompression device mounted to the engine.

As shown in FIGS. 8 and 9, the decompression device 104 includes a solenoid-operated actuator or drive 140 reciprocable by excitement of a solenoid. The solenoid-operated actuator 140 is reciprocated to cause linear movement of a decompression rod 141. The decompression rod 141 has a pin 142 at its one end. A decompression arm 143, one for each cylinder, has one end rotatably mounted to the decompression rod 141 through the pin 142. A decompression plate 145, one for each cylinder, is rotatably mounted to the other end of the decompression arm 143 by a mounting bolt 144.

A rocker arm 124 is arranged in a face-to-face relation to with a cam 121 of a camshaft 120 and includes a decompression slipper 146. As is well known, the rocker arm 124 is operable to open and close intake and exhaust valves.

The decompression device 104 includes a spring 148 adapted to urge the distal end of the decompression plate 145 to allow to enter between a decompression cam 147 and decompression slipper 146. A cylindrical bracket 125 is attached to a cylinder head 102a by a mounting bolt 144. The coil spring 148 extends around the bracket 125 and is engaged with the proximal end of the decompression plate 145.

Figure 11:
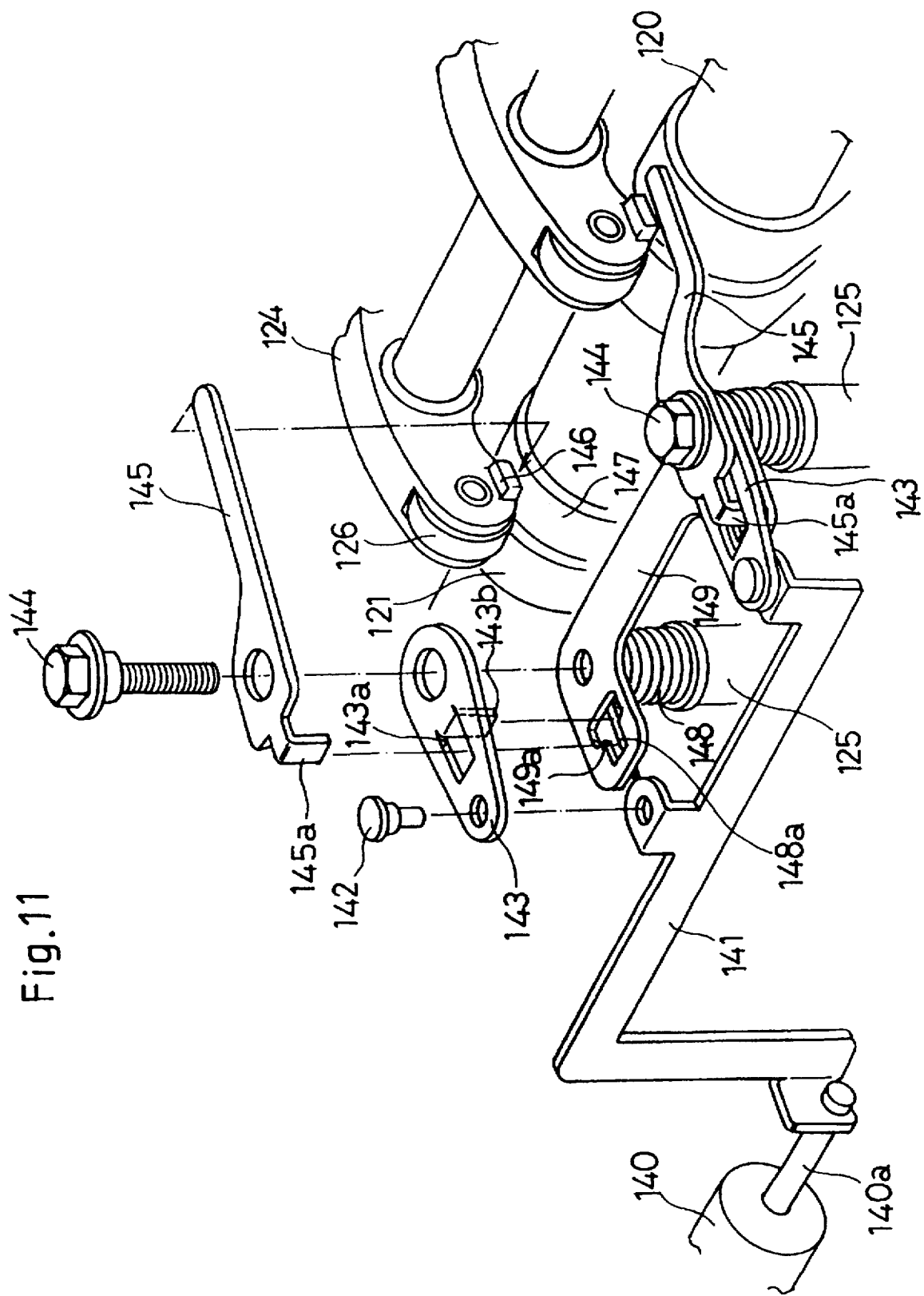
FIG. 11 is an exploded perspective view showing the principal part of the decompression device.

As shown in FIGS. 9 and 11, the decompression device 104 includes a decompression stopper plate 149 for limiting (angular) movement of the decompression plate 145. The decompression stopper plate 149 together with the decompression plate 145 is attached to the bracket 125 by the mounting bolt 144.

As shown in FIG. 11, the decompression plate 145 has a projection 145a at its proximal end. The decompression arm 143 and the decompression stopper plate 149 have respective apertures 143a and 149a through which the projection 145a extends. The decompression arm 143 has a central projection 143b which extends through the aperture 149a of the decompression stopper plate 149.

The projections 143b and 145a are engaged with the aperture 149a of the decompression stopper plate 149 which is fixed to the bracket 125. This engagement limits (angular) movement of the decompression arm 143 and the decompression plate 145.

The decompression spring 148 has one end 148a engaged with the projection 143b of the decompression arm 143 and the projection 145a of the decompression plate 145 and urges the distal end of the decompression plate 145 to cause it to enter between the decompression cam 147 and the decompression slipper 146.

The decompression rod 141 is directly connected to the solenoid-operated actuator 140. The decompression plate 145 is not directly connected to the decompression rod 141. Rather, the decompression arm 143 and the decompression spring 148 jointly provide a flexible connection between the decompression rod 141 and the decompression plate 145.

The decompression plate 145 may not moved below the decompression slipper 146 due to the position of the decompression cam 147 when the decompression device 104 is in its operative condition. In such a case, the decompression spring 148 reduces reaction force applied to the distal end of the decompression plate 145 to prevent undue load on the solenoid-operated actuator 140.

Where a plurality of cylinders are provided, the cams 121 of these cylinders may be offset from each other to prevent the decompression plates 145 from entering below the decompression slippers 146 since these members are driven by only a single solenoid-operated actuator. In such a case, the decompression plates 145 can be independently operated under the influence of the respective decompression springs.

Solenoids are excited for a predetermined period of time (pulse signal) to operate the solenoid-operated actuator 140. This operation holds the decompression device 104 in its operative or inoperative condition. For example, a magnet is disposed between two solenoids. This arrangement reduces the load and size of the solenoid-operated actuator 140 as well as prevents the flow of a current through the solenoids when the decompression device 104 is held in a condition other than transition from its operative to inoperative condition or vice versa, that is, when the engine 102 is stopped or normally running.

When the decompression device 104 is held in its operative condition, an actuator element 140a is advanced to move the decompression rod 141 in the direction of the arrow shown in FIG. 8. The decompression arm 143 then causes pivotal movement of the decompression plate 145 about the mounting bolt 144. As this occurs, the distal end of the decompression plate 145 enters between the decompression cam 147 and the decompression slipper 146 noting again that the plate 145 is also under the influence of the decompression spring 148.

As shown in FIG. 10, a space (s) is formed between the lowest surface of the cam 121 and a roller 126 which is mounted to one end of the rocker arm 124. See FIG. 10(B). This space holds intake and exhaust valves 122 and 123 open to prevent an increase in the pressure within the engine combustion chamber. The intake and exhaust valves 122 and 123 are connected to the rocker arms 124.

When, on the other hand, the decompression device 104 is held in its inoperative condition, the actuator element 140a is retreated to move the decompression rod in a direction opposite to the direction shown by the arrow in FIG. 8. The decompression arm 143 then causes pivotal movement of the decompression plate 145 about the mounting bolt 144 in a direction opposite to the direction as mentioned earlier. As this occurs, the distal end of the decompression plate 145 is removed from between the decompression cam 147 and the decompression slipper 146. As a result, the cam 121 is brought into contact with the roller 126 to close the intake and exhaust valves 122 and 123. See FIG. 10(A). The engine is now held under normal operating condition.

Figure 12:
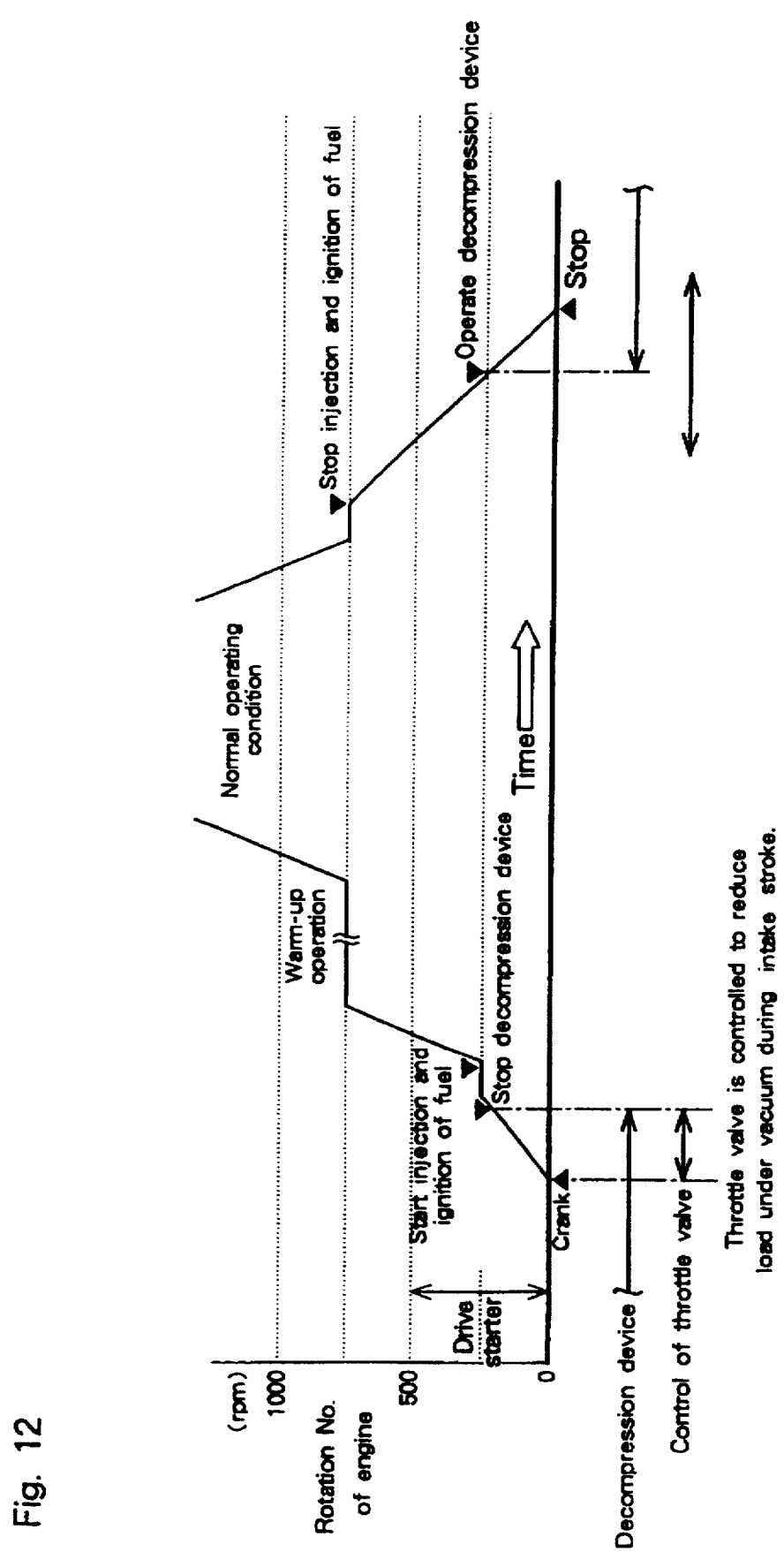
FIG. 12 is a timing chart showing operation of the decompression device shown in FIG. 8, with the vertical and horizontal axes showing engine speed and time, respectively.

FIG. 7 is a block diagram showing operation of the control system 101 for an internal combustion engine with associated decompression device thus constructed. Also, FIG. 12 is a timing chart showing operation of the control system 101.

First, the starter means 103 is operable to start the engine 102. At this time, the decompression device 104 is held in its operative condition. That is, the actuator element 140a of the solenoid-operated actuator 140 is advanced to cause the distal end of the decompression plate 145 to enter between the decompression cam 147 and the decompression slipper 146. The intake and exhaust valves 122 and 123 are then held open to prevent an increase in the pressure within the combustion chamber of the engine.

As mentioned earlier, FIG. 12 is a timing chart showing operating conditions of the engine, and operative and inoperative conditions of the decompression device, with engine speed shown in the vertical axis, and time in the horizontal axis.

When the speed of the engine 102 gradually increases and then, exceeds, for example, 250 r.p.m. at which the decompression device 104 is stopped (or rendered inoperative), the engine speed sensor means 108 is operable to send the engine control means 111 a signal to that effect. The engine control means 111 then sends a stop command signal (decompression stop command signal) to the decompression device 104. As this occurs, the decompression device 104 is moved from its operative condition to its inoperative condition. The cranking speed of the engine 102 at which the decompression device 104 is moved from its operative condition to its inoperative condition is preferably greater than the engine speed at which the engine 102 is subject to resonance.

The throttle valve 105 is held open under the control of the valve control means 106 to reduce work loads due to intake airflow between when the engine control means 111 receives a crank signal from the crank signal sensor means 112 and when the decompression device 104 is moved from its operative condition to its inoperative condition.

The engine control means 111 instructs the valve control means 106 to move the throttle valve 105 to a predetermined position when the stop sensor means 110 detects that the decompression device 104 is rendered inoperative, and the engine speed sensor means 108 detects that the speed of the engine 102 reaches a cranking speed, for example, 250 r.p.m. The engine control means 111 also instructs the fuel injection control means 109 to initiate the injection of fuel. The engine 102 is then cranked and is rotated at a speed, for example, of 750 r.p.m. for warm-up purposes.

If a stop command signal is sent to the engine control means 111 intentionally by the driver, the engine control means 111 instructs the valve control means 106 to gradually close the throttle valve 105. The engine control means 111 also instructs the fuel injection control means 109 to gradually reduce the amount of the fuel. When the engine speed is reduced to, for example, 750 r.p.m., the injection of the fuel is stopped after its speed is maintained for a predetermined period of time.

When the engine speed sensor means 108 detects that the engine speed is further reduced to, for example, below 250 r.p.m., the decompression device 104 is moved from its inoperative condition to its operative condition, and the throttle valve 105 is closed. The engine 102 is thereafter stopped and prepared for the next cranking operation.

Figure 13:
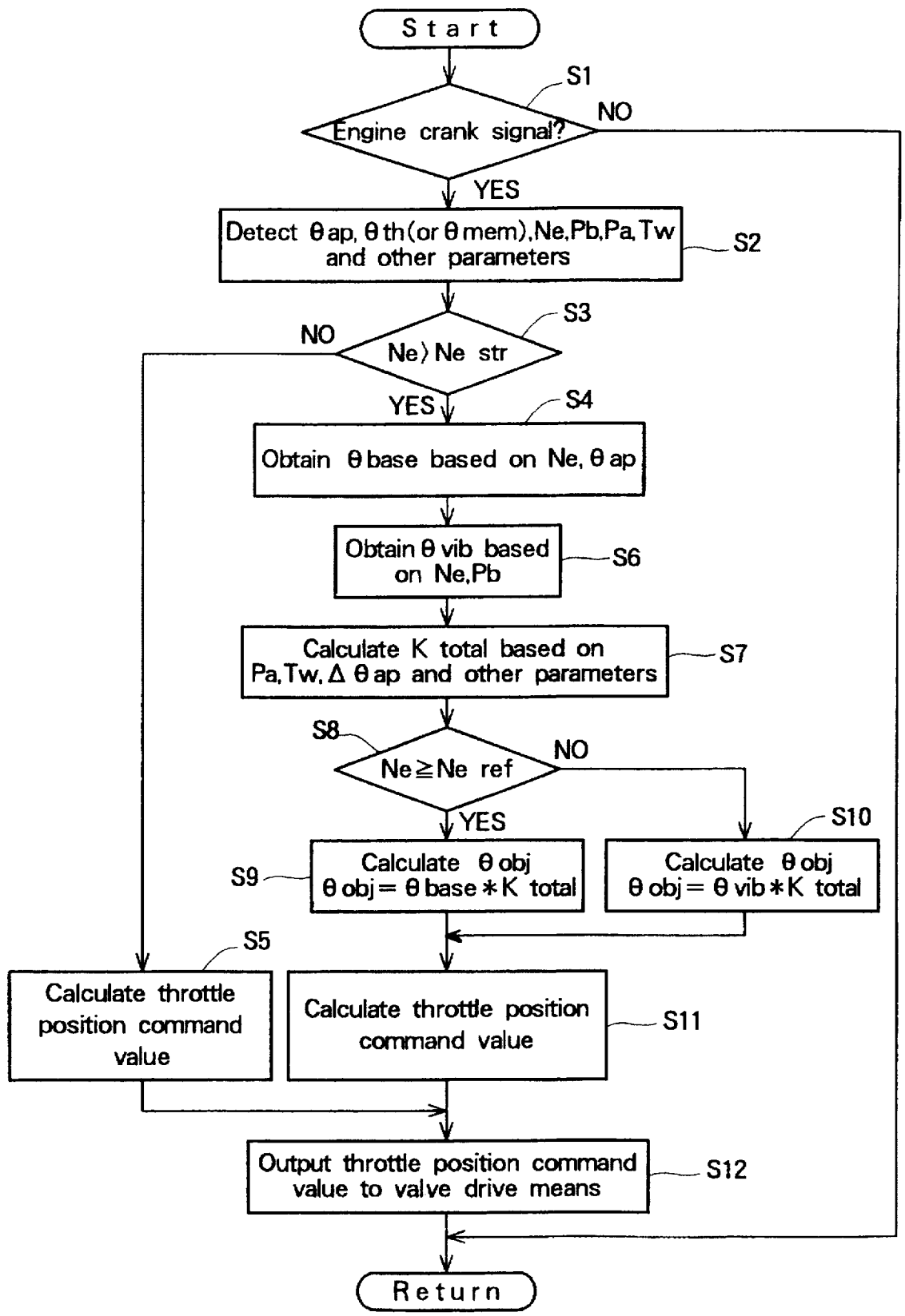
FIG. 13 is a flow chart used to calculate a throttle position command value.

FIG. 13 is a flow chart showing how a position command value θcom of the throttle valve 105 varies from the start to end of operation of the engine 102.

First, the crank signal sensor means 112 determines whether the starter means 103 has developed a crank signal. The crank signal, when developed, is sent to the engine control means 111 (see step 1).

Then, the accelerator pedal position sensor means 115 detects an acceleration pedal position θap of the accelerator pedal 114. The throttle position sensor means 107 detects a throttle position θth (θmem) of the throttle valve 105. The engine speed sensor means 108 detects an engine speed Ne of the engine. The engine operating condition sensor means 113 detects an engine load Pb of the engine 102. Other parameters such as an atmospheric pressure Pa and a coolant temperature Tw of the engine are also detected (step 2).

In step 3, the engine control means 111 is operable to compare the engine speed Ne with a cranking speed Ne str of the engine. If the engine speed Ne is greater than the cranking speed Ne str, then a given table is searched to obtain a throttle base position θbase based on the engine speed Ne and the accelerator pedal position θap (step 4).

If, on the other hand, the engine speed Ne is less than the cranking speed Ne str, a throttle position command value θcom is obtained as follows (step 5).

$$\theta com = \theta str - \theta th\ (\theta mem)$$

where θstr is the position of the throttle valve during cranking of the engine.

Next, the engine control means 111 is operable to search through a given table to obtain an anti-vibration throttle position θvib based on the engine speed Ne and engine load Pb (step 6).

The engine control means 111 is then operable to calculate the total of amendment values Ktotal based on the atmospheric pressure Pa, the coolant temperature Tw and accelerator pedal position variable speed Δθap and other parameters (step 7).

In step 8, the engine control means is operable to compare the engine speed Ne with an anti-vibration determination speed Ne ref. If the engine speed Ne is equal to or greater than the anti-vibration determination speed Ne ref, then the valve control means 106 is operable to obtain a target throttle position θobj as follows (step 9).

$$\theta obj = \theta base * Ktotal$$

Alternatively, a vehicle speed Vcar may be compared with the anti-vibration determination speed Vcar ref.

If, on the other hand, the engine speed Ne is less than the anti-vibration determination speed Ne ref, then the valve control means 106 is operable to obtain the target throttle position θobj as follows (step 10).

$$\theta obj = \theta vib * Ktotal$$

The valve control means 106 is also operable to obtain the throttle position command value θcom as follows (step 11).

$$\theta com = \theta obj - \theta th\ (\theta mem)$$

The throttle position command value θcom [θstr−θth (θmem) or θbj−θth (θmem)] is given to the valve drive means of the valve control means 106 to controllably move the throttle valve 105 to a position θobj (step 12).

With the vibrational property and operating condition of the engine 102 in mind, the throttle valve 105 is so controlled as to reduce work loads under vacuum during the intake stroke. The work load during the intake stroke as well as during the compression stroke may cause severe vibration. Repeated execution of the steps reduces torque fluctuation and greatly facilitates cranking of the engine. Thus, the engine 102 is less vibrated and makes less noise.

Proper control of the decompression device 104 and the throttle valve 105 reduces pumping loss until the power stroke. It is also possible to reduce the noise of starter gears due to a change in torque and vibration during cranking of the engine, and to facilitate cranking and better control exhaust emissions.

Also, this results in a decrease in the size of the starter, the battery and other components.

Figure 16:
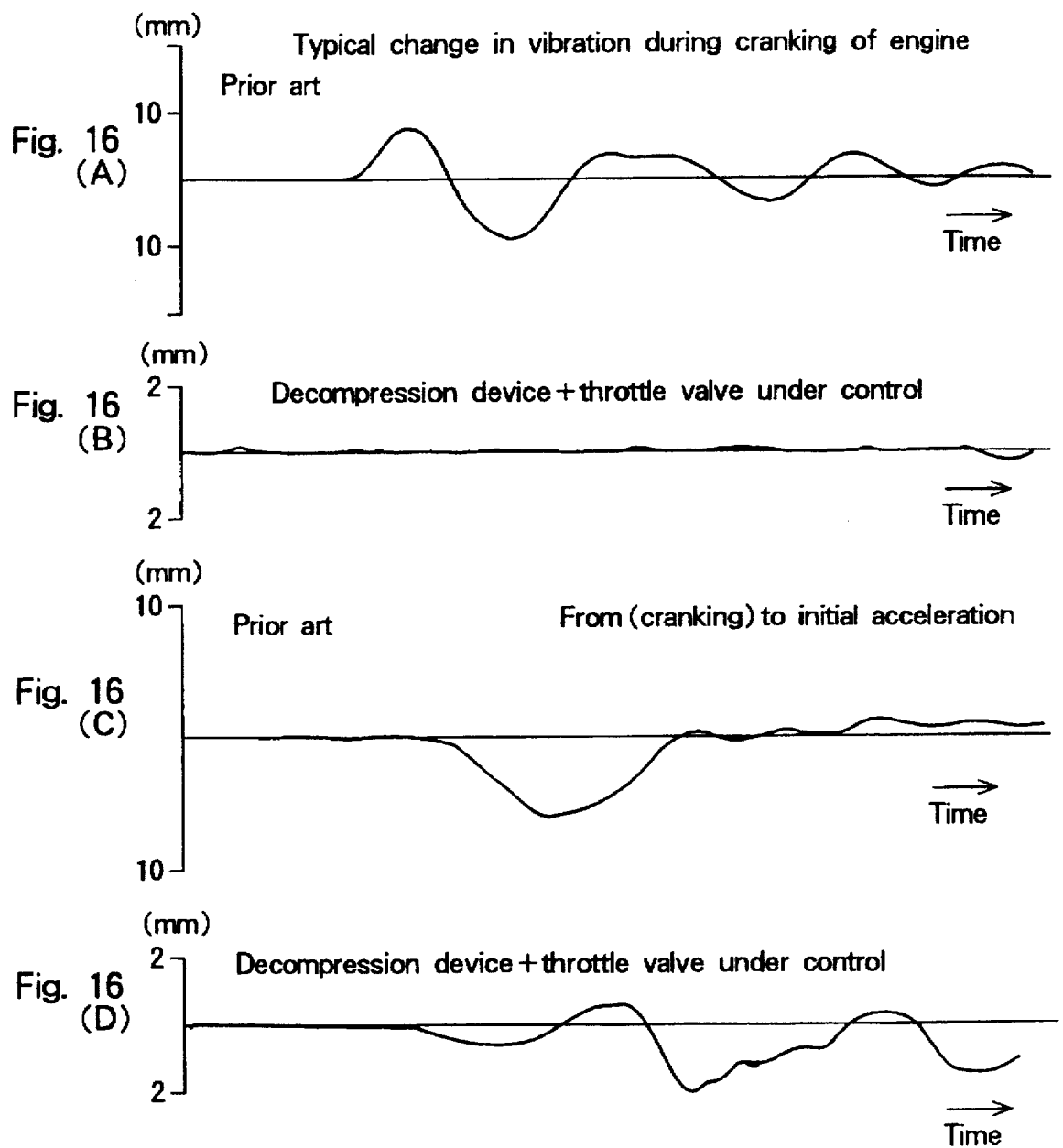
FIGS. 16(A)–(D) collectively show a typical change in vibration from cranking to initial acceleration of the engine.

FIGS. 16(A)–16(D) show a typical change in vibration of the engine 102 from cranking to initial acceleration of the engine 102. FIG. 16(A) shows a change in vibration during cranking of a conventional engine. FIG. 16(B) shows a change in vibration of the engine of the present invention under the control of the decompression device and the throttle valve. FIG. 16(C) shows a change in vibration from cranking to initial acceleration of the prior art engine. FIG. 16(D) shows a change in vibration of the engine under the control of the decompression device and the throttle valve. In any of these figures, the vertical axis shows the degree of vibration, and the horizontal axis shows time.

The prior art engine is subject to substantial vibration during cranking of the engine as shown in FIG. 16(A). In the present invention, the amount of vibration is small as shown in FIG. 16(B). The prior art engine is substantially displaced to the minus side during initial acceleration of the engine as shown in FIG. 16(C). In the present invention, the amount of displacement is small as shown in FIG. 16(D). It will now be understood that control of the decompression device 104 and the throttle valve 105 enables a reduction in the amount of vibration or displacement during not only cranking, but also initial acceleration of the engine.

Figure 17:
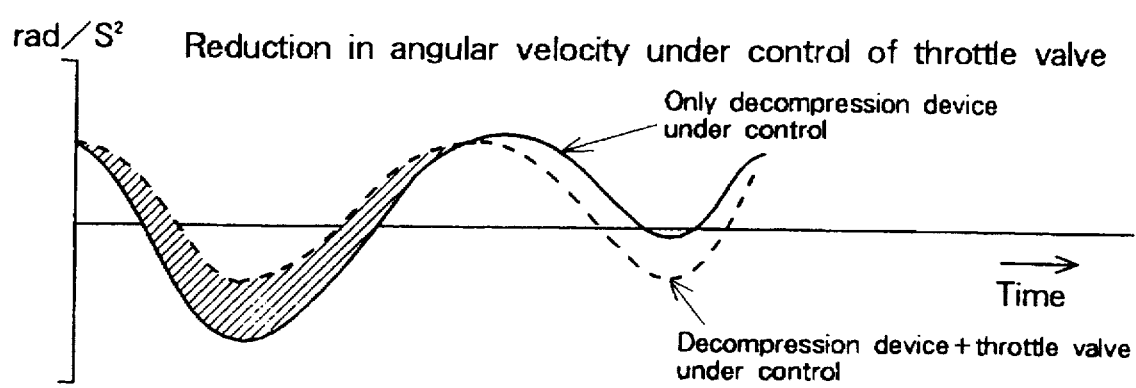
FIG. 17 shows a change in angular velocity under the control of a throttle valve from cranking to initial acceleration of the engine.

FIG. 17 shows a change in angular velocity during cranking to initial acceleration of the engine under the control of the throttle valve 105. It will be understood that the angular velocity under the control of both the decompression device 104 and the throttle valve 105 as shown by the broken line is less than the angular velocity under the control of the decompression device 104 only as shown by the solid line.

Figure 14:
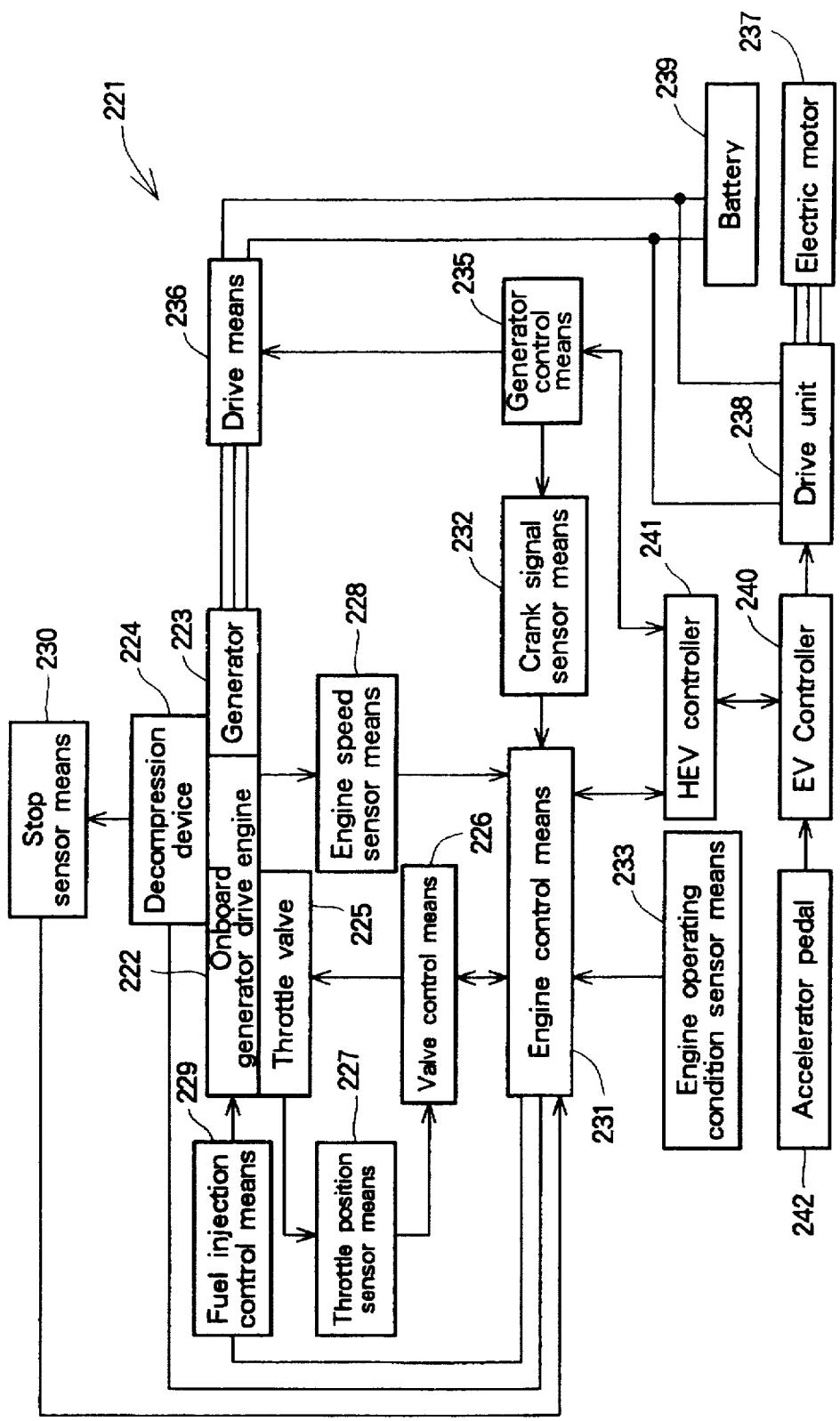
FIG. 14 is a block diagram of a control system for controlling the engine and decompression device, according to a second embodiment of the present invention.

FIG. 14 shows a second concept of the present invention and is a block diagram showing a control system according to another embodiment.

An internal combustion engine control system 221 comprises an onboard generator 223 which acts as an electric motor to start an onboard generator drive engine 222 or acts as a generator by means of the onboard generator drive engine 222, a decompression device 224 adapted to reduce engine torque, a throttle valve 225 as an intake airflow control valve, and a valve control means 226 which includes means for calculating the throttle position command value of the throttle valve 225, and means for operating the throttle valve 225. The decompression device 224 has a structure identical to that shown in FIGS. 8 to 11.

The internal combustion engine control system 221 also includes a throttle position sensor means 227 for detecting the valve of the throttle position 225, an engine speed sensor means 228 for detecting the speed of rotation of the engine 222, a fuel injection control means 229 for controlling the injection of fuel in the engine 222, a stop sensor means 230 for detecting whether the decompression device is stopped (or rendered inoperative), and an engine control means 231 for controlling the decompression device 224, the valve control means 226, the fuel injection control means 229 and other means.

The control system 221 further includes a crank signal sensor means 232 for detecting whether a crank signal is sent to the engine 222. To this end, the crank signal sensor means 232 is operable to detect operating conditions of the onboard generator 223 or to detect whether an ignition switch is on.

The internal combustion engine control system 221 additionally comprises an engine operating condition sensor means 233 for detecting coolant temperature and other parameters, a generator control means 235 for controlling the onboard generator 223, and a generator drive means 236 for driving the onboard generator 223.

Other important electric vehicle components include, among others, an electric motor 237 for driving the vehicle, an electric motor drive unit 238 for supplying a controlled amount of electric power, a battery 239 as a power source for supplying electric power to the electric motor 237 through the electric motor drive unit 238, and an electric vehicle (EV) controller 240 for controlling the electric motor drive unit 238 and other means.

The reference numeral 241 designates a host (HEV) controller for generally controlling the EV controller 240, the generator control means 235, and the engine control means 231. 242 designates an accelerator pedal for the electric vehicle.

Figure 15:
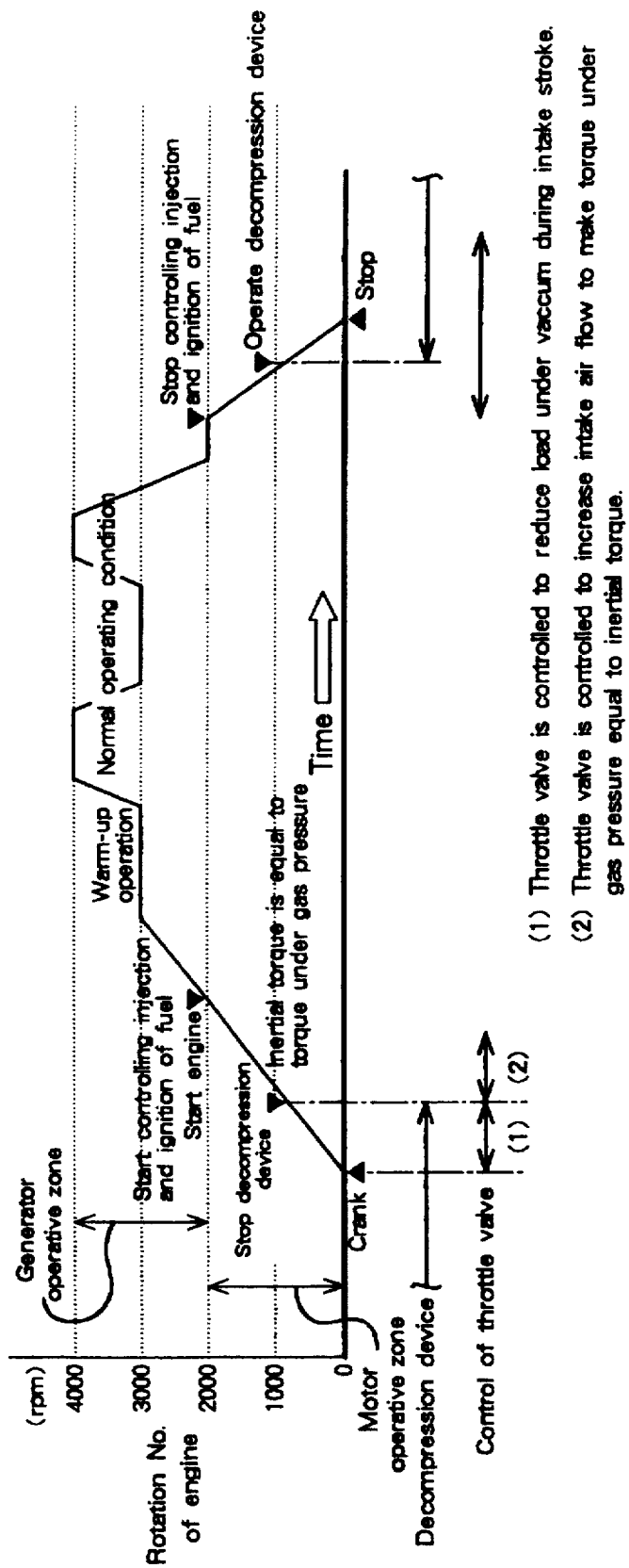
FIG. 15 is a timing chart for use in the second embodiment of the present invention, with the vertical and horizontal axes showing engine speed and time, respectively.

FIG. 14 is a block diagram showing operation of the internal combustion engine control system 221 of the present invention thus constructed. Reference will also be made to FIG. 15 wherein a timing chart is provided.

In the electric vehicle (EV) with the internal combustion engine control system 221, the EV controller 240 is operable to send a drive command signal to the electric motor drive unit 238 when the driver operates the accelerator pedal 242. Then, power is fed from the battery 239 through the electric motor drive unit 238 to the electric motor 237. The electric motor 237 is thereby driven to cause the electric vehicle to run. The consumption of the power of the battery 239 varies depending on running conditions of the electric vehicle. The battery power is greatly consumed when the electric vehicle is started, is accelerated or travels uphill.

During running of the electric vehicle (also, when its is stopped), the EV controller 240 is operable to monitor the state-of-charge of the battery 239 by multiplying an output current, an output voltage and other parameters of the battery 239. If it is below a predetermined level, then the EV controller 240 sends a crank command signal to the generator control means 235 and the engine control means 231 through the HEV controller 241 so as to charge the battery 239. Alternatively, the driver may intentionally input the crank command signal into the EV controller 240.

Information on the state-of-charge of the battery 239 as well as the crank command signal is sent to the engine control means 231. This information is used to calculate the required output of the onboard generator. Information on the required output thus calculated is then sent to the valve control means 226.

The valve control means 226 is operable to calculate a target throttle position of the throttle valve 225 based on an anti-vibration throttle position table. This target throttle position should allow the speed of rotation of the engine 222 to meet with the required output of the onboard generator 223. However, since anti-vibration capability is given priority, such a target throttle position may not necessarily allow the engine speed to meet with the required output of the onboard generator 223.

The engine control means 231 is operable to receive a sensed signal from the stop sensor means 230 and determine whether the decompression device 224 is in such a condition to reduce engine torque, or that the decompression device 224 is in its operative condition. Meanwhile, the generator control means 235 instructs the generator drive means 236 to cause the onboard generator 223 to act as an electric motor (starter).

Upon receipt of power from the battery 239, the onboard generator 223 is operated as an electric motor (starter). This results in a gradual increase in the speed of rotation of the engine 222 as shown in FIG. 15. The engine control means 231 is operable to send a stop or inoperative command signal to the decompression device 224 when the engine speed sensor means 228 detects that the engine speed exceeds, for example, 1,000 r.p.m. As this occurs, the decompression device 224 is moved from its operative condition to its inoperative condition. From the time when the crank command signal is sent to the engine control means 231 to the time when the decompression device 224 is moved from its operative condition to its inoperative condition, the throttle valve 225 is held open to reduce work loads due to intake airflow.

When the stop sensor means 230 detects that the decompression device 224 is stopped, and the engine speed sensor means 228 detects that the speed of rotation of the engine 222 reaches a cranking speed, for example, 2,000 r.p.m., the engine control means 231 instructs the valve control means 226 to move the throttle valve 225 to a predetermined position.

The decompression device 224 is effective when the engine is rotated at a low speed since a torque varies depending on gas pressure. An inertial torque increases as the engine speed increases. When the engine speed reaches a predetermined level, the inertial torque and the torque under gas pressure become equal in opposite phases so as to minimize vibration. If the engine speed exceeds the predetermined level, then the inertial torque overcomes the torque under gas pressure. When this occurs, the decompression device 224 is moved from its operative condition to its inoperative condition so as to cause the throttle valve 225 to produce a torque under gas pressure equal to the inertial torque. It is thus possible to increase the engine speed to a target level with a lesser degree of vibration.

Such control of the decompression device 224 and the throttle valve 225 prevents the engine mount from being subject to resonance during cranking of the engine and allows it to enjoy a wider range of spring constants. This results in an improvement in the performance of the engine mount at normal engine speed.

When the engine speed sensor means 228 detects that the engine speed reaches a cranking speed, for example, 2,000 r.p.m., the engine control means 231 instructs the fuel injection control means 229 to initiate the injection of fuel. The engine 222 is then moved into a warm-up condition and is rotated at a speed, for example, of 3,000 r.p.m. After a predetermined period of time has passed, the engine control means 231 instructs the valve control means 226 to open the throttle valve 225 in accordance with the calculated valve position command value. The engine 222 is then rotated at a normal engine speed, for example, 4,000 r.p.m.

As the engine has moved to its normal operating condition, the generator control means 235 instructs the generator drive means 236 to use the onboard generator 223 as a generator. By these instructions, the onboard generator 223 acts as a generator so as to supply electric power to the battery 239 through the generator drive means 236 to charge the battery 239.

When the battery 239 is recharged to a predetermined charge level by the onboard generator 223 as a generator, the EV controller 240 is operable to send a stop command signal to generator control means 235 and the engine control means 231 through the HEV controller 241. In some cases, the driver may intentionally give a stop command signal to the EV controller 240.

Next, the engine control means 231 instructs the valve control means 226 to close the throttle valve 225 and also the fuel injection control means 229 to gradually reduce the amount of fuel to be injected. When the speed of the engine 222 is rotated at a reduced speed, for example, of 2,000 r.p.m. for a predetermined period of time, the engine control means 231 instructs the fuel injection control means 229 to stop the injection of the fuel. Thereafter, the onboard generator 223 is rendered inoperative and stops its function as a generator.

When the engine speed sensor means 228 detects that the speed of the engine 222 is further reduced to, for example, below 1,000 r.p.m., the decompression device 224 is moved from its inoperative condition to its operative condition. Also, the throttle valve 225 is moved to its closed condition. Thereafter, the engine 222 is stopped and prepared for the next cranking operation.

In order to obtain a valve position command value θcom during normal operation of the engine 222, various parameters are detected. These parameters show running condition of the electric vehicle and include vehicle speed θcom, discharged amount of the battery 239 DOD, speed of the engine 222 Ne as detected by the engine speed sensor means 228, throttle position θth (θmem) of the throttle valve 225 detected by the throttle position sensor means 227, load Pb of the engine 222, atmospheric pressure Pa, coolant temperature TW of the engine 222 and other parameters.

Next, the engine control means 231 is operable to search through a given table to obtain a required amount of electric power PENE for the onboard generator 223, based on the vehicle speed Vcar and the discharged amount DOD of the battery 239. By the same token, a required speed NENE is obtained based on the vehicle speed Vcar.

The engine control means 231 is then operable to search through a given table to obtain a throttle basic position θbase based on the required power PNEN and the required speed NENE and also, to obtain an anti-vibration throttle position θvib based on the engine speed Ne and the engine load Pb.

Thereafter, the engine control means 231 is operable to calculate the total Ktotal based on the atmospheric pressure Pa, the coolant temperature Tw and other parameters for amendments to various parameters. The engine speed Ne is then compared with anti-vibration control determination speed Ne ref. If the engine speed Ne is equal to or greater than the anti-vibration control determination speed Ne ref, the target throttle position θobj is then obtained as follows.

$$θobj = θbase * K\ total$$

Alternatively, the vehicle speed Vcar may be compared with the anti-vibration control determination speed Vcar ref.

If the engine speed Ne is less than the anti-vibration control determination speed Ne ref, the engine control means 231 is operable to calculate the target throttle position θobj as follows.

$$θobj = θvib * K\ total$$

Also, the throttle position command is obtained as follows.

$$\text{value } θcom = θobj - θth\ (θmem)$$

The throttle position command value θcom is inputted to the valve control means 226 so as to move the throttle valve 225 to a position corresponding to the target throttle position θobj.

With vibrational property and operating condition of the engine 222 in mind, the throttle valve 225 is so controlled as to reduce work loads under vacuum during the intake stroke. The work load during the intake stroke as well as during the compression stroke may cause severe vibration. As shown in FIGS. 16(A)–(D) and 17, this control reduces torque fluctuation and greatly facilitates cranking of the engine. Thus, the engine 222 is less vibrated and makes less noise.

The injection and ignition of fuel is initiated after the speed of the engine 222 reaches a level at which it is subject to resonance. This control, in addition to action of the decompression device 224 and control of the throttle valve 225, prevents vibration due to a change in torque when the engine is rotated at a speed where resonance occurs. The engine is subject to substantial vibration if the ignition takes place before the engine 222 reaches a level where resonance occurs.

FIGS. 16(A)–(D) show a typical change in the amount of vibration from cranking to initial acceleration of the engine 222. It is to be understood that the decompression device 224 and the throttle valve are effective to reduce the change of vibration.

FIG. 17 shows a change in angular velocity from cranking to initial acceleration of the engine under the control of the control of the throttle valve 225. A combination of the decompression device 224 and the throttle valve 225 better reduce the change of angular velocity than the decompression device only.

According to the second concept of the present invention, the decompression device is moved from its operative condition to its inoperative condition after the crank signal sensor means detects an on-signal of the starter, an on-signal of the ignition switch, a drive signal for the onboard generator and other signals as engine crank signals. Also, the intake airflow control or throttle valve is controlled to release pressure from the engine cylinders and to reduce the amount of a torque when the internal combustion engine is started. Thus, it is possible to reduce vibration and noise of the internal combustion engine.

It is also possible to reduce the load and thus, size of the starter means.

Further, the decompression device is rendered inoperative after the speed of rotation of the internal combustion engine including a mount system exceeds a level wherein resonance occurs. Thereafter, the injection of fuel takes place. This prevents escape of the fuel and thus, better control of exhaust emissions. Although there have been described what are at present considered to be the preferred embodiments of the invention, it will be understood that variations and modifications may be made thereto without departing from the scope or essence of the invention as set forth in the following claims.

We claim:

1. A control system for an engine with an associated decompression device, comprising:
   engine speed sensor means for detecting a speed of rotation of the engine;
   fuel injection control means for controlling the injection of a fuel in the engine;
   means for operating said decompression device in response to the speed of rotation of the engine;
   said decompression device being operated during cranking and stopping of the engine; and
   said fuel injection control means being operable to initiate and stop the injection of the fuel in response to the sensed signal from said engine speed sensor means.

2. A control system for engine with an associated decompression device according to claim 1, wherein said operating means renders said decompression device operative in response to a sensed signal indicative of the speed of rotation of said engine.

3. A control system for an engine according to claim 1, wherein said operating means operates said decompression device relative to all cylinders of the engine simultaneously.

4. A control system for an engine with an associated decompression device, comprising:
   engine speed sensor means for detecting a speed of rotation of the engine;
   fuel injection control means for controlling the injection of a fuel in the engine;
   means for operating said decompression device in response to the speed of rotation of the engine;
   said fuel injection control means being operable to initiate and stop the injection of the fuel in response to a sensed signal from said engine speed sensor means; and
   said engine is an onboard generator drive engine operatively associated with an onboard generator/electric motor for driving same.

5. A control system for an engine according to claim 4, further including crank command signal sensor means for detecting whether a crank command signal is sent to said onboard generator/electricmotor, said crank command signal sensor means being operable to develop a sensed signal whereby said onboard generator/electric motor is rendered operative as an electric motor so as to drive said onboard generator drive engine, and wherein said operating means moves said decompression device from an operative condition to an inoperative condition when the speed of rotation of said onboard generator drive engine exceeds a decompression inoperative speed.

6. A control system for an engine according to claim 5, further including stop sensor means for detecting whether said decompression device is stopped, and cranking speed sensor means for detecting cranking speed of said onboard generator drive engine, said onboard generator drive engine being operable to initiate the injection of the fuel by said fuel injection control means in response to a sensed signal from said stop sensor means and a sensed signal from said cranking speed sensor means.

7. A control system for an onboard generator drive engine according to claim 6, wherein the speed of rotation of said onboard generator drive engine when the decompression device is moved from its operative condition to its inoperative condition and vice versa is greater than a speed of rotation when the onboard generator drive engine is subject to resonance.

8. A control system for an engine according to claim 4, further including stop command signal sensor means for detecting whether a stop command signal is sent to said onboard generator/electricmotor, said stop command signal sensor means being operable to develop a sensed signal to thereby stop the injection of the fuel in the onboard generator drive engine by the fuel injection control means and thereafter, stop the onboard generator/electric motor as a generator, and wherein said operating means moves said decompression device from an inoperative condition to an operative condition when the speed of rotation of said onboard generator drive engine is below a decompression operative speed.

9. A control system for an onboard generator drive engine according to claim 8, wherein the speed of rotation of said onboard generator drive engine when the decompression is moved from its operative condition to its inoperative condition and vice versa is less than a speed of rotation of the onboard generator drive engine when the injection of the fuel in said onboard generator drive engine is initiated and stopped.

10. A control system for an onboard generator drive engine according to claim 9, wherein the speed of rotation of said onboard generator drive engine when the decompression device is moved from its operative condition to its inoperative condition and vice versa is greater than a speed of rotation when the onboard generator drive engine is subject to resonance.

11. A control system for an engine according to claim 8, wherein the speed of rotation of said engine when the decompression device is moved from its operative condition to its inoperative condition and viceversa is less than a speed of rotation of the engine when the injection of the fuel in said engine by said fuel injection control means is initiated and stopped.

12. A control system for an internal combustion engine, comprising: intake airflow control valve means for controlling an airtake airflow control valve means for controlling an intake airflow control valve to allow air to flow into the internal combustion engine, fuel injection control means for controlling injection of a fuel in the internal combustion engine, engine speed sensor means for detecting the speed of rotation of the internal combustion engine, decompression means for reducing pressure within a cylinder of the internal combustion engine, starter means for initiating rotation of the internal combustion engine:

crank signal sensor means for detecting whether a crank signal is sent to the internal combustion engine;

said intake airflow control valve being moved to an open condition by said intake airflow control means in response to the crank signal as sensed by crank signal sensor means;

said starter means initiates rotation of the internal combustion engine in response to the crank signal;

operation of said decompression means being stopped when the speed of rotation of the internal combustion engine reaches a predetermined cranking speed; and said fuel injection control means initiates the injection of the fuel when the speed of rotation of the internal combustion engine exceeds the predetermined cranking speed.

13. A control system for an internal combustion engine according to claim 12, wherein said predetermined cranking speed is greater than a speed of rotation when the internal combustion engine is subject to resonance.

14. A control system for an internal combustion engine according to claim 13, wherein said decompression means includes a first actuator element, a second actuator element, and a resilient element disposed between said first and second actuator elements.

15. A control system for an internal combustion engine according to claim 14, wherein said internal combustion engine is a multi-cylinder engine, one first said actuator element being provided for each cylinder, and said resilient element disposed between said first and second actuator element follows vacuum action of each of the cylinders.

16. A control system for internal combustion engine according to claim 14, wherein said decompression means includes an element for limiting movement of said first and second actuator elements.

17. A control system for an internal combustion engine according to claim 12, wherein said internal combustion engine is an onboard generator drive engine for a vehicle.

18. A control system for an internal combustion engine according to claim 12, wherein said decompression means includes a first actuator element, a second actuator element, and a resilient element disposed between said first and second actuator elements.

19. A control system for an internal combustion engine according to claim 18, wherein said internal combustion engine is a multi-cylinder engine, one said first actuator element being provided for each cylinder, and said resilient element disposed between said first and second actuator elements follows vacuum action of each of the cylinders.

20. A control system for an internal combustion engine according to claim 18, wherein said decompression means includes an element for limiting movement of said first and second actuator elements.

21. A method of controlling an internal combustion engine having intake airflow control valve means for controlling an air intake control valve to allow air to flow into the internal combustion engine, fuel injection control means for controlling the injection of fuel in the internal combustion engine, engine speed sensor means for detecting the speed of rotation of the internal combustion engine, decompression means for reducing pressure within a cylinder of the internal combustion engine, and starter means for initiating rotation of the internal combustion engine, said method comprising the steps of:

detecting whether a crank signal is sent to the internal combustion engine;

controlling said intake airflow control valve control means to move said intake airflow control valve to an open condition in response to a crank signal as sensed by said crank signal sensor means;

initiating rotation of the internal combustion engine through said starter means in response to the crank signal;

stopping operation of said decompression means when the speed of rotation of the internal combustion engine reaches a predetermined cranking speed; and initiating an injection of the fuel through said fuel injection control means when the speed of rotation of the internal combustion engine exceeds the predetermined cranking speed.

* * * * *

UNITED STATES PATENT AND TRADEMARK OFFICE
CERTIFICATE OF CORRECTION

PATENT NO. : 5,632,238

DATED : May 27, 1997

INVENTOR(S) : Akiyoshi Furukawa; Takao Nishida; Atsushi Kamachi; Kenji Fukuda; Michio Suzuki; Kazushi Ogiyama; Yoshiharu Hagiwara It is certified that error appears in the above-indentified patent and that said Letters Patent is hereby corrected as shown below:

Column 9, line 19, delete "to".

Column 9, line 24, after "allow", insert --it--.

Column 9, line 24, after "and" insert --the--.

Signed and Sealed this

Twenty-third Day of September, 1997

Attest:

BRUCE LEHMAN

Attesting Officer         Commissioner of Patents and Trademarks

UNITED STATES PATENT AND TRADEMARK OFFICE
CERTIFICATE OF CORRECTION

PATENT NO. : 5,632,238
DATED : May 27, 1997
INVENTOR(S) : Akiyoshi Furukawa; Takao Nishida; Atsushi Kamachi; Kenji Fukuda; Michio Suzuki; Kazushi Ogiyama; Yoshiharu Hagiwara It is certified that error appears in the above-indentified patent and that said Letters Patent is hereby corrected as shown below:

Column 13, line 43, change "valve of the throttle position" to --position of the throttle valve--.

Column 17, line 12, delete "the control of";

Column 17, line 13, after "the" (second occurrence only), insert --control of the--.

Column 17, line 15, change "reduce" to --reduces--.

Column 18, line 53, after "decompression" insert --device--.

Signed and Sealed this

Ninth Day of December, 1997

Attest:

BRUCE LEHMAN

*Attesting Officer*  *Commissioner of Patents and Trademarks*